(12) United States Patent
Raykova et al.

(10) Patent No.: US 8,370,621 B2
(45) Date of Patent: Feb. 5, 2013

(54) COUNTING DELEGATION USING HIDDEN VECTOR ENCRYPTION

(75) Inventors: Mariana Raykova, New York, NY (US); Seny F. Kamara, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 241 days.

(21) Appl. No.: 12/961,805

(22) Filed: Dec. 7, 2010

(65) Prior Publication Data

US 2012/0144185 A1    Jun. 7, 2012

(51) Int. Cl.
 *H04L 9/00* (2006.01)
(52) U.S. Cl. .................... 713/150; 713/189; 380/255
(58) Field of Classification Search .................... None
 See application file for complete search history.

(56) References Cited

U.S. PATENT DOCUMENTS

| | | | | |
|---|---|---|---|---|
| 8,225,106 | B2 * | 7/2012 | Mattsson ................ | 713/189 |
| 2005/0005286 | A1 * | 1/2005 | Koskela et al. .......... | 725/31 |
| 2008/0098370 | A1 | 4/2008 | Fontoura et al. | |
| 2010/0169328 | A1 | 7/2010 | Hangartner | |
| 2010/0179855 | A1 | 7/2010 | Chen et al. | |

OTHER PUBLICATIONS

"Amazon Web Services: Overview of Security Processes", Retrieved at << http://awsmedia.s3.annazonaws.com/pdf/AWS_Security_Whitepaper.pdf >>, Aug. 2010, pp. 1-22.

Wei, et al., "SecureMR: A Service Integrity Assurance Framework for MapReduce", Retrieved at << http://ieeexplore.ieee.org/stamp/stamp.jsp?tp=&arnumber=5380520 >>, 2009, pp. 73-82.

Roy, et al., "Airavat: Security and Privacy for MapReduce", Retrieved at << http://www.usenix.org/event/nsdi10/tech/full_papers/roy.pdf >>, Networked Systems Design and Implementation—NSDI 2010, pp. 1-16.

Zhou, et al., "Towards Secure Cloud Data Management", Retrieved at << http://netdb.cis.upenn.edu/papers/ds2_socc10.pdf >>, Feb. 2010, pp. 1-6.

Yang, et al., "Osprey: Implementing MapReduce-Style Fault Tolerance in a Shared-Nothing Distributed Database", Retrieved at << http://db.csail.mit.edu/pubs/paper.pdf >>, Data Engineering (ICDE), 2010 IEEE 26th International Conference, Mar. 1-6, 2010, pp. 12.

"Amazon Elastic MapReduce", Retrieved at << http://aws.amazon.com/elasticmapreduce >>, Retrieved Nov. 15, 2010, pp. 7.

Afrati, et al., "A New Computation Model for Cluster Computing", Retrieved at << http://infolab.stanford.edu/~ullman/pub/mapred-model-report.pdf >>, Dec. 30, 2009, pp. 1-26.

(Continued)

*Primary Examiner* — Ponnoreay Pich
(74) *Attorney, Agent, or Firm* — Jared S. Goff

(57) ABSTRACT

Counting values can be encrypted as a set of counting value cyphertexts according to a hidden vector encryption scheme using sample values of a set of samples, where each of the samples can include multiple sample values. Additionally, tokens can be generated. The tokens can be configured according to the hidden vector encryption scheme, such that each of the tokens can enable decryption of matching cyphertexts. Processing of the counting value cyphertexts and the tokens can be delegated to a map-reduce computer cluster. The cluster can run a map-reduce program to produce and return count representations. Each count representation can represent a count of a set of the counting value cyphertext(s) whose decryption was enabled by one or more of the token(s). For example, the counts may be counts that can be used in constructing a data structure such as a decision tree.

20 Claims, 5 Drawing Sheets

OTHER PUBLICATIONS

Canetti, et al., "Security and Composition of Multi-Party Cryptographic Protocol", Retrieved at << http://citeseerx.ist.psu.edu/viewdoc/download?doi=10.1.1.21.4870&rep=rep1&type=pdf >>, Sep. 9, 1999, pp. 1-56.

Chierichetti, et al., "Max-Cover in Map-Reduce", Retrieved at << http://www.tomkinshome.com/site_media/papers/papers/CKT10a.pdf >>, Apr. 26-30, 2010, pp. 10.

Chu, et al., "Map-Reduce for Machine Learning on Multicore", Retrieved at << http://www.cs.stanford.edu/people/ang/papers/nips06-mapreducemulticore.pdf >>, In NIPS, 2006, pp. 8.

Das, et al., "Google News Personalization: Scalable Online Collaborative Filtering", Retrieved at << http://www2007.org/papers/paper570.pdf >>, May 8-12, 2007, pp. 271-280.

Dean, et al., "Map Reduce: Simplified Data Processing on Large Clusters", Retrieved at << http://static.googleusercontent.com/external_content/untrusted_dlcp/labs.google.com/en//papers/mapreduce-osdi04.pdf >>, In OSDI'04: Proceedings of the 6th conference on Symposium on Opearting Systems Design & Implementation, 2004, pp. 1-13.

"Hadoop. Powered by hadoop.", Retrieved at << http://wiki.apache.org/hadoop/PoweredBy >>, Retrieved Date: Sep. 22, 2010, pp. 13.

Kang, et al., "PEGASUS: A Peta-Scale Graph Mining System Implementation and Observations", Retrieved at << http://citeseerx.ist.psu.edu/viewdoc/download?doi=10.1.1.156.764&rep=rep1&type=pdf >>, IEEE International Conference on Data Mining, 2009, pp. 10.

Karloff, et al., "A Model of Computation for Map Reduce", Retrieved at << http://research.yahoo.com/files/mrc.pdf >>, 2010, pp. 11.

Liu, et al., "Cloud MapReduce: A MapReduce Implementation on Top of a Cloud Operating System", Retrieved at << http://aleph-i.com/papers/cloudmapreduce.pdf >>, Accessed on Sep. 22, 2010, pp. 1-14.

Lin, et al., "Design Patterns for Efficient Graph Algorithms in Map Reduce", Retrieved at << http://www.umiacs.umd.edu/~jimmylin/publications/Lin_Schatz_MLG2010.pdf >>, In MLG '10: Proceedings of the Eighth Workshop on Mining and Learning with Graphs, 2010, pp. 78-85.

Rao, et al., "Ranking and Semi-Supervised Classification on Large Scale Graphs Using Map-Reduce", Retrieved at << http://citeseerx.ist.psu.edu/viewdoc/download?doi=10.1.1.165.1182&rep=rep1&type=pdf >>, Proceedings of the 2009 Workshop on Graph-based Methods for Natural Language Processing, ACL-IJCNLP 2009, Aug. 7, 2009, pp. 16.

Shamir, Adi, "How to Share a Secret", Retrieved at << http://www.google.co.in/url?sa=t&source=web&cd=1&ved=0CBUQFjAA&url=http%3A%2F%2Fciteseerx.ist.psu.edu%2Fviewdoc%2Fdownload%3Fdoi%3D10.1.1.80.8910%26rep%3Drep1%26type%3Dpdf&ei=o9GZTPL2L8Srcem-1NkH&usg=AFQjCNEPZXfq5Qp-_4ngcjy5z-1H2iy3bA >>, 1979, pp. 612-613.

"Airavat: Improved Security for MapReduce", Retrieved at << http://www.cs.utexas.edu/~indrajit/airavat.html >>, Retrieved on Oct. 20, 2010, pp. 2.

Zhu, et al., "Private Searching on MapReduce", TrustBus 2010, LNCS 6264, 2010, pp. 93-101.

"Cloudera: Apache Hadoop for Enterprise", Retrieved at << http://www.cloudera.com >>, Retrieved on Nov. 15, 2010, pp. 2.

"PoweredBy—Hadoop Wiki", Retrieved at << http://wiki.apache.org/hadoop/PoweredBy?action=print >>, Retrieved on Nov. 15, 2010, pp. 16.

Zowadny, Jeremy, "Yahoo! Launches World's Largest Hadoop Production Application", Retrieved at << http://developer.yahoo.com/blogs/hadoop/posts/2008/02/yahoo-worlds-largest-production-hadoop/ >>, Feb. 29, 2008, pp. 4.

Abadi, et al., "On Hiding Information from an Oracle", 1989, pp. 1-29.

Applebaum, et al., "From Secrecy to Soundness: Efficient Verification via Secure Computation", Automata, Languages and Programming—ICALP 2010, pp. 12.

Boneh, et al., "Evaluating 2-DNF Formulas on Ciphertexts", Apr. 2, 2006, pp. 1-16.

Chung, et al., "Improved Delegation of Computation using Fully Homomorphic Encryption", Apr. 28, 2010, pp. 28.

Culler, et al., "LogP: A Practical Model of Parallel Computation", vol. 39, No. 11 Communications of the ACM, Nov. 1996, pp. 78-85.

Dachman-Soled, et al., "Efficient Robust Private Set Intersection", ACNS 2009, LNCS 5536, 2009, Pages pp. 125-142.

Dean, et al., "MapReduce: Simplified Data Processing on Large Clusters", Communications of the ACM vol. 51, No. 1, Jan. 2008, pp. 107-113.

Fortnow, et al., "Interactive Proof Systems and Alternating Time-Space Complexity", Symposium on Theoretical Aspects of Computer Science—STACS 1991, 1991, pp. 1-23.

Fortune, et al., "Parallelism in Random Access Machines", STOC '78 Proceedings of the tenth annual ACM symposium on Theory of computing, 1978, pp. 114-118.

Gennaro, et al., "Non-Interactive Verifiable Computing: Outsourcing Computation to Untrusted Workers", Feb. 1, 2010, pp. 1-19.

Gentry, Craig, "Fully Homomorphic Encryption Using Ideal Lattices", STOC'09, May 31-Jun. 2, 2009, pp. 169-178.

Gentry, et al. "A Simple BGN-type Cryptosystem from LWE", Mar. 30, 2010, pp. 1-15.

Goldwasser, et al., "Delegating Computation: Interactive Proofs for Muggles", STOC'08, May 17-20, 2008, pp. 10.

Isard, et al., "Dryad: Distributed Data-Parallel Programs from Sequential Building Blocks", EuroSys'07, Mar. 21-23, 2007, pp. 14.

Ishai, et al., "Cryptography from Anonymity", Proceedings of the 47th Annual IEEE Symposium on Foundations of Computer Science (FOCS'06), 2006, pp. 10.

Katz, et al., "Predicate Encryption Supporting Disjunctions, Polynomial Equations, and Inner Products", Advances in Cryptology—EUROCRYPT 2008 in Advances in Cryptology—EUROCRYPT 2008, vol. 4965 (2008), 2008, pp. 146-162.

Lund, et al., "Algebraic Methods for Interactive Proof Systems", 1992, pp. 1-10.

Micali, Silvio, "CS Proofs", IEEE, 1994, pp. 436-453.

Naor, Moni, "Oblivious Polynomial Evaluation", SIAM Journal on Computing—SIAMCOMP, 2006, pp. 1-31.

Shamir, Adi, "IP=SPACE", Journal of the Association for Computing Machinery, vol. 39. No. 4, Oct. 1992, pp. 869-877.

Shen, Emily, "Predicate Privacy in Encryption Systems", Dec. 24, 2008, pp. 1-33.

Yu, et al., "DryadLINQ: A system for General-Purpose Distributed Data-Parallel Computing Using a High-Level Language", 8th USENIX Symposium on Operating Systems Design and Implementation, Dec. 208, pp. 1-14.

"Amazon Elastic Map Reduce Getting Started Guide", Retrieved at << http://s3.amazonaws.com/awsdocs/ElasticMapReduce/latest/emr-gsg.pdf >>, Last Updated Nov. 12, 2010, pp. 38.

Beaver, et al., "Hiding Instances in Multioracle Queries", Symposium on Theoretical aspects of Computer Science (STACS '90), 1990, pp. 37-48.

Valiant, Leslie, A Bridging Model for Parallel Computation, Communications of the ACM, vol. 33, No. 8, Aug. 1990, pp. 103-111.

Raykova, et al., "Polynomial Evaluation Delegation", U.S. Appl. No. 12/963,400, filed Dec. 8, 2010, pp. 1-31 & Drawing Sheets 1-5.

\* cited by examiner

COUNTING DELEGATION USING HIDDEN VECTOR ENCRYPTION

BACKGROUND

A map-reduce framework defines a computational model that can be used to design and implement parallel processing techniques on computer clusters, such as large-scale distributed systems. While the term "MapReduce" is often used to describe such a framework, the term "map-reduce" (without capital letters) is used herein to clarify that reference is not being made to any particular implementation. A map-reduce operation is an operation performed according to the map-reduce framework. A map-reduce operation includes a mapping operation that includes multiple individual operations that can be distributed across multiple computing environments (mappers) and performed in parallel. Each individual mapping operation takes one or more input label-value pairs and outputs one or more intermediate label-value pairs. The map-reduce operation typically also includes a partition operation that takes one or more intermediate pairs and defines a partition of intermediate values. Additionally, the map-reduce operation includes a reduce operation that can include multiple individual reduce operations that can be distributed across multiple computing environments (reducers). The individual reduce operations each take an input label and a partition of intermediate values and outputs an output label-value pair. A map-reduce cluster is a computer cluster that is configured to run map-reduce operations according to the map-reduce framework.

Some computer cluster providers offer access to map-reduce computer clusters "as a service." This can allow a map-reduce program and associated data pairs to be delegated to a third-party's computer cluster by a data provider's cluster client. The computer cluster can run the map-reduce program on the data in the map-reduce cluster and return results to the data provider. Access to other computing environments (e.g., mainframe computers or computer clusters that are not using the map-reduce framework) may also be offered as a service.

SUMMARY

While delegation of processing computations to remote computing environments such as map-reduce clusters enables clients to utilize processing capabilities of those environments, data providers often must trust the provider of the remote environment with data and data processing information. The tools and techniques described herein can allow delegation to a remote computing environment of counting data that is encrypted using hidden vector encryption so that the remote computing environment can process the counting data and return representations of resulting counts. A hidden vector encryption scheme is an encryption scheme that includes generating a key and using the key to encrypt an input value with a data vector that includes a set of data values. The key can also be used to encrypt tokens with a matching vector that includes a set of matching values. The token can be used to decrypt the input value if the data vector used to encrypt the input value has data values that match corresponding matching values in the matching vector. The matching vector may also include wildcard values that do not need to be matched to allow the corresponding token to be used in decrypting a value.

In one embodiment, the tools and techniques can include encrypting counting values as a set of counting value cyphertexts according to a hidden vector encryption scheme using sample values of a set of samples, where each of the samples can include multiple sample values (for example, each of the samples can be represented as a vector having multiple values). Additionally, tokens can be generated. The tokens can be configured according to the hidden vector encryption scheme, such that each of the tokens can enable decryption of matching cyphertexts that match a set of one or more match values used to generate the token. Processing of the counting value cyphertexts and the tokens can be delegated to a remote computing environment, such as a map-reduce cluster. Count representations can be received back from the remote computing environment, where each count representation represents a count of a set of the counting value cyphertext(s) whose decryption was enabled by a set of the token(s). For example, the counts may be counts that can be used in constructing a data structure such as a decision tree.

In another embodiment of the tools and techniques, a set of counting value cyphertexts and a set of tokens can be received. The counting value cyphertexts and the tokens can be configured according to a hidden vector encryption scheme. Additionally, a map-reduce operation can be performed in a computer cluster. The map-reduce operation can include performing a set of operations, which can include using tokens to decrypt corresponding counting value cyphertexts to produce counting values. Additionally, the set of operations can include performing summing operations of at least a portion of the counting values to produce one or more count representations. Each of the count representation(s) can represent a count of a set of counting value cyphertexts whose decryption was enabled by a set of one or more of the tokens. As an example, using the tokens for decryption can include multiple mapping operations that can be performed in parallel, and the summing operations can include one or more reducing operations.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Embodiments described herein are directed to techniques and tools for securing counting operations delegated to map-reduce clusters. Such improvements may result from the use of various techniques and tools separately or in combination.

Such techniques and tools may include delegation to a map-reduce computer cluster of counting data that is encrypted using hidden vector encryption so that the computer cluster can process the counting data and return representations of resulting counts. For example, this may be done as part of a process of constructing a decision tree.

Figure 1:
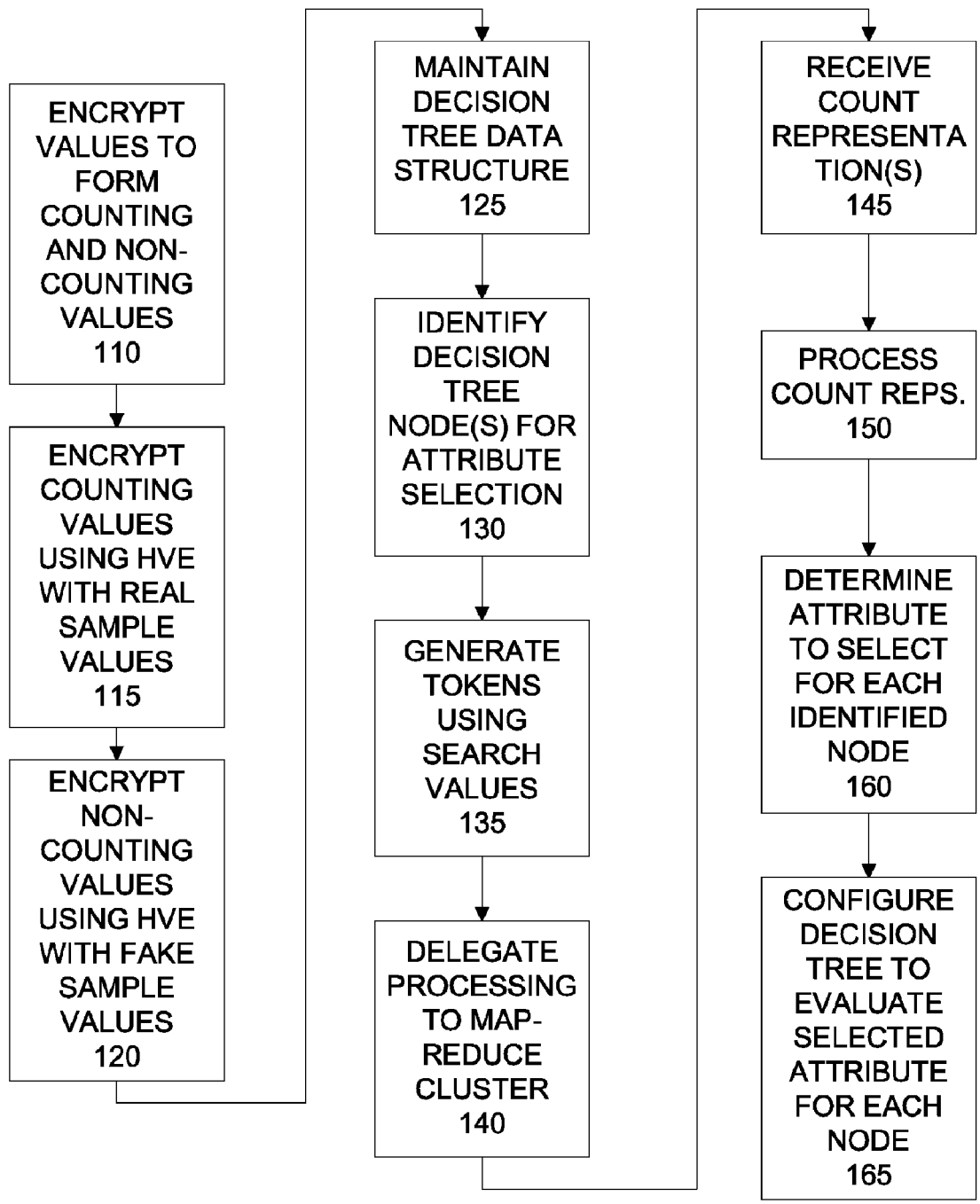
FIG. 1 is a flowchart of a technique for counting delegation using hidden vector encryption.

Referring now to FIG. 1, a technique for counting delegation using hidden vector encryption will be discussed. The technique of FIG. 1 and the other techniques discussed herein may be performed in one or more computing environments such as the computing environment discussed below with reference to FIG. 2. The technique can include encrypting (110) values using an additively homomorphic encryption scheme to form counting values (e.g., encryptions of the number 1) and non-counting values (e.g., encryptions of the number 0). An additively homomorphic encryption scheme is an encryption scheme that allows an encryption key to be generated and used to encrypt values. Summing operations (which are defined under the particular scheme and are typically more complex than simple summing operations on non-encrypted values) can be performed on the encrypted values to add encrypted values to each other and/or to non-encrypted values, thereby producing encrypted sums. The encrypted values and the encrypted sums can be decrypted using the key. The counting values can be encrypted (115) as a set of counting value cyphertexts according to a hidden vector encryption scheme. This can be done using real values of a set of real samples to generate real vectors (i.e., vectors corresponding to the real samples) and using the real vectors to encrypt the counting values. The real values can include, for each of the real samples, one or more real attribute values and a real class value. Non-counting values can also be encrypted (120) as a set of non-counting value cyphertexts according to the hidden vector encryption scheme using "fake" (i.e., "dummy") values of a set of "fake" samples to generate "fake" vectors (i.e., vectors that do not represent samples in the set of samples being used as the "real" samples that are to be included in counts, although the fake vectors can be formed using values (e.g., attribute values) that are present in the real samples and real vectors). The fake vectors can be used to encrypt the non-counting values. The fake values can include one or more fake attribute values and a fake class value for each of the fake samples.

A data structure that includes at least a portion of a decision tree to be constructed using the set of samples can be maintained (125), and one or more nodes of the decision tree can be identified (130) so that an attribute can be selected for evaluation at that node. Token(s) can be generated (135) according to a hidden vector encryption scheme such that each token enables decryption of cyphertexts that match a set of search value(s) used to generate the token.

Processing of the counting value cyphertexts, the non-counting cyphertexts, and the tokens can be delegated (140) to a map-reduce cluster, and count representations can be received (145) from the map-reduce cluster. Each of the count representations can represent a count of a set of one or more of the counting value cyphertexts whose decryption was enabled by a set of one or more of the tokens, without the count representations representing counts of the non-counting value cyphertexts. The count representations can be cyphertexts encrypted according to the additively homomorphic encryption scheme.

The count representations can be processed (150) (e.g., decrypted, summed for pseudonyms corresponding to real values, etc.) according to the additively homomorphic encryption scheme to produce decrypted count values. For each of the identified decision tree nodes, it can be determined (160) which of a set of available attributes to select as a selected attribute to be evaluated for the node. This determination (160) for each such node can include using at least a portion of the decrypted count values. Additionally, the decision tree can be configured (165) so that the tree will evaluate the selected attribute at the node during classification using the tree.

Pseudonyms of values may also be used to enhance security. For example, the real and fake vectors can each include a set of multiple terms for each of one or more of the real/fake values of the set of real/fake samples, and each set of multiple terms can include a set of one or more pseudonyms. Pseudonyms may be used for some values but not for others. In one example, when pseudonyms are used, the number of pseudonyms for a corresponding value can be at least half of a number of possible distinct values (e.g., the number of possible distinct values for an attribute or class). Count representations for a group of tokens generated using a set of multiple terms for one of the real values of the set of real samples can be summed to arrive at a count for that one of the real values.

Accordingly, the tools and techniques described herein can allow delegation of counting operations such as counts for constructing decision trees to be delegated to the map-reduce cluster without the map-reduce cluster having access to the values of the real samples (which can be obscured by being used as vectors to encrypt the counting values), to the values that are being matched in the count (which can be encrypted encrypted as tokens), and in some situations not even to the values of the counts themselves (e.g., where additively homomorphic encryption of counting values and fake samples can be used to obscure the counts for the map-reduce cluster).

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. For example, the various procedures described herein may be implemented with hardware or software, or a combination of both. Moreover, for the sake of simplicity, flowcharts may not show the various ways in which particular techniques can be used in conjunction with other techniques.

I. Exemplary Computing Environment

Figure 2:
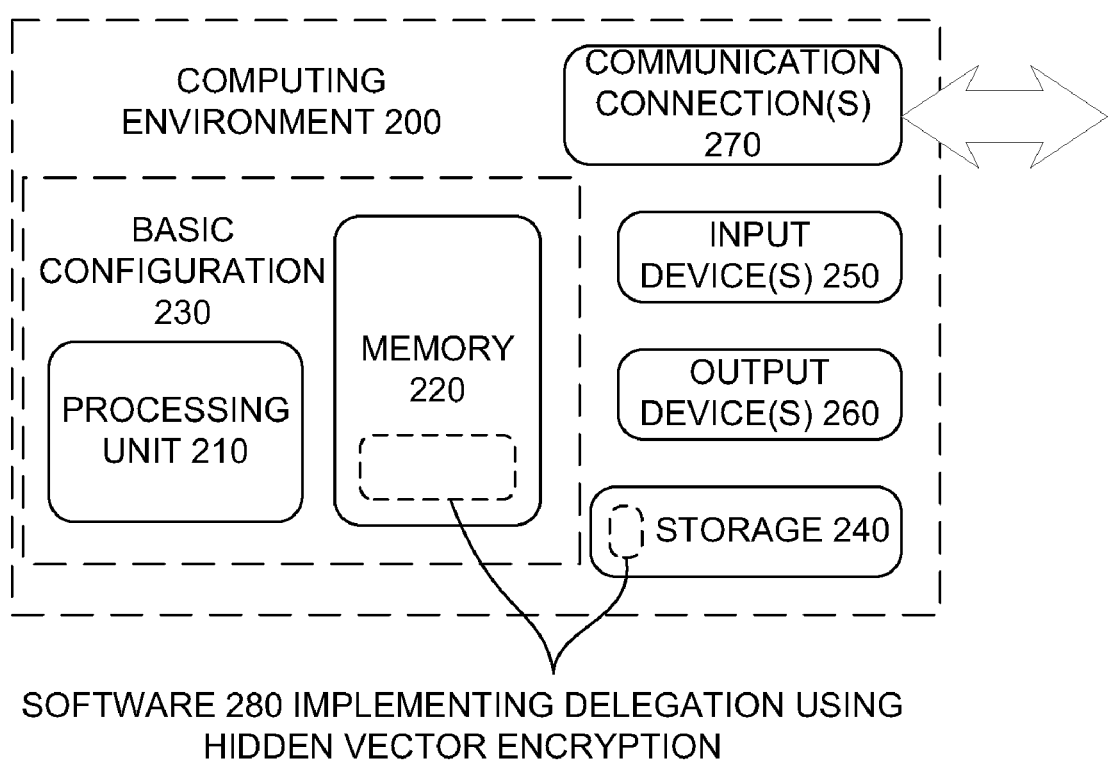
FIG. 2 is a block diagram of a suitable computing environment in which one or more of the described embodiments may be implemented.

FIG. 2 illustrates a generalized example of a suitable computing environment (200) in which one or more of the described embodiments may be implemented. For example, one or more such computing environments can be used as a map-reduce client environment, as an environment in a map-reduce cluster, etc. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (200) is not intended to suggest any limitation as to scope of use or functionality of the invention, as the present invention may be implemented in diverse general-purpose or special-purpose computing environments.

With reference to FIG. 2, the computing environment (200) includes at least one processing unit (210) and memory (220). In FIG. 2, this most basic configuration (230) is included within a dashed line. The processing unit (210) executes computer-executable instructions and may be a real or a virtual processor. In a multi-processing system, multiple processing units execute computer-executable instructions to increase processing power. The memory (220) may be volatile memory (e.g., registers, cache, RAM), non-volatile memory (e.g., ROM, EEPROM, flash memory), or some combination of the two. The memory (220) stores software (280) implementing counting delegation using hidden vector encryption.

Although the various blocks of FIG. 2 are shown with lines for the sake of clarity, in reality, delineating various components is not so clear and, metaphorically, the lines of FIG. 2 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 2 is merely illustrative of an exemplary computing device that can be used in connection with one or more embodiments of the present invention. Distinction is not made between such categories as "workstation," "server," "laptop," "handheld device," etc., as all are contemplated within the scope of FIG. 2 and reference to "computer," "computing environment," or "computing device."

A computing environment (200) may have additional features. In FIG. 2, the computing environment (200) includes storage (240), one or more input devices (250), one or more output devices (260), and one or more communication connections (270). An interconnection mechanism (not shown) such as a bus, controller, or network interconnects the components of the computing environment (200). Typically, operating system software (not shown) provides an operating environment for other software executing in the computing environment (200), and coordinates activities of the components of the computing environment (200).

The storage (240) may be removable or non-removable, and may include non-transitory computer-readable storage media such as magnetic disks, magnetic tapes or cassettes, CD-ROMs, CD-RWs, DVDs, or any other medium which can be used to store information and which can be accessed within the computing environment (200). The storage (240) stores instructions for the software (280).

The input device(s) (250) may be a touch input device such as a keyboard, mouse, pen, or trackball; a voice input device; a scanning device; a network adapter; a CD/DVD reader; or another device that provides input to the computing environment (200). The output device(s) (260) may be a display, printer, speaker, CD/DVD-writer, network adapter, or another device that provides output from the computing environment (200).

The communication connection(s) (270) enable communication over a communication medium to another computing entity. Thus, the computing environment (200) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable storage media. Computer-readable storage media are any available non-transitory storage media that can be accessed within a computing environment. By way of example, and not limitation, with the computing environment (200), computer-readable storage media include memory (220), storage (240), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations correspond- ing to these terms vary depending on the implementation.

II. Private Delegation System and Environment

Figure 3:
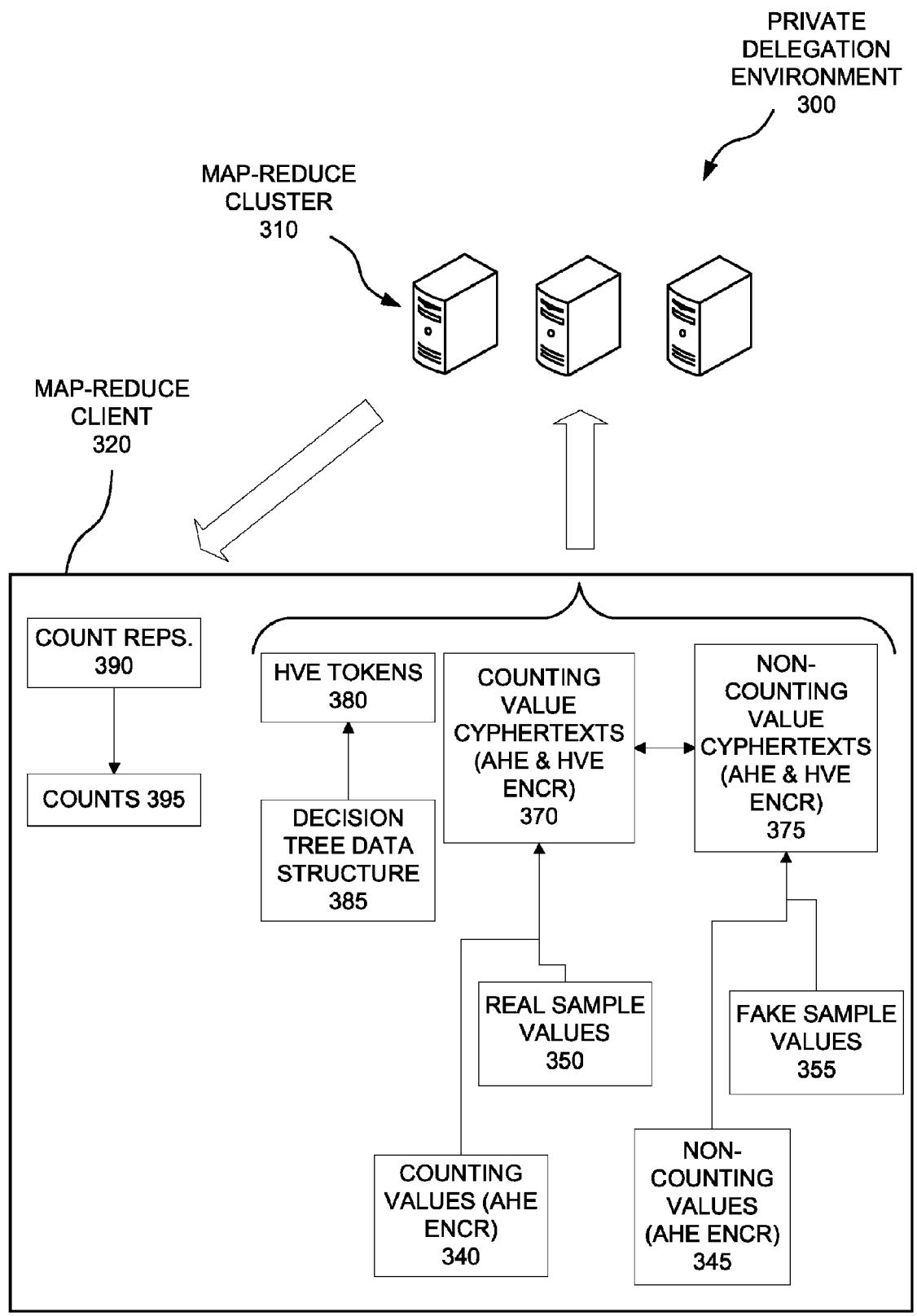
FIG. 3 is a schematic diagram of a map-reduce securing environment.

FIG. 3 is a schematic diagram of a private delegation environment (300) in conjunction with which one or more of the described embodiments may be implemented. The environment (300) can include a remote computing environment such as a map-reduce cluster (310), as well as a client such as a map-reduce client (320). The map-reduce client (320) can delegate the processing of data to the map-reduce cluster (310). However, the map-reduce client (320) can obscure the data in a way that can hide information about the data from the map-reduce cluster (310), while still allowing the map-reduce cluster (310) to perform the delegated processing of the data. The map-reduce client (320) may also perform some processing of data received back from the map-reduce cluster (310) to de-obscure the data.

A. Counting Delegation Using Hidden Vector Encryption

The map-reduce client (320) can encrypt counting values (340) and non-counting values (345) using an additively homomorphic encryption scheme. The non-counting values (345) are values that will not result in counts when summed according to the additively homomorphic encryption scheme, and the counting values (340) are values that will result in counts when summed according to the additively homomorphic encryption scheme. For example, the counting values (340) may be encryptions of the value 1 and the non-counting values (345) may be encryptions of the value 0.

The map-reduce client (320) can also take real sample values (350) and use them as vectors to encrypt the counting values (340) to produce counting value cyphertexts (370) according to a hidden vector encryption scheme. Additionally, the map-reduce client (320) can take fake sample values (355) and use them as vectors to encrypt the non-counting values (345) to produce non-counting value cyphertexts (375) according to the hidden vector encryption scheme. Because the counting values (340) and non-counting values (345) are cyphertexts themselves, the counting value cyphertexts (370) and non-counting value cyphertexts (375) have two layers of encryption. Accordingly, decrypting the values under the hidden vector encryption scheme will result in the counting values (340) and non-counting values (345), which are encrypted according to the additively homomorphic encryption scheme. The counting value cyphertexts (370) and the non-counting value cyphertexts (375) can be intermingled (e.g., intermingled randomly) as illustrated by the double-arrow line between them in FIG. 3. This intermingling can be done so that the map-reduce cluster (310) will be unable to distinguish between the counting value cyphertexts (370) resulting from real sample values (350) and the non-counting value cyphertexts (375) resulting from the fake sample values (355), or between the counting values (340) and non-counting values (345) themselves (because the counting values (340) and non-counting values (345) are encrypted using the additively homomorphic encryption scheme).

The map-reduce client (320) can also generate hidden vector encryption tokens (380) using a set of one or more match values, such as a set of one or more values from the real sample values (350). In addition, the map-reduce cluster can generate encrypted identifiers (not shown) of those tokens (380). The identifiers may be encrypted (and later decrypted) by the map-reduce client (320) using an encryption key generated according to any of various semantically secure encryption schemes. As discussed above, a hidden vector encryption token can be used to decrypt a cyphertext if the cyphertext was encrypted using a vector that matches the match values of the token. The vectors used to encrypt the hidden vector encryption tokens (380) may also include wildcards, which do not need to be matched for the tokens to be used in decrypting cyphertexts.

The map-reduce client (320) can delegate a process of counting a number of the real sample values (350) that match a set of match values. To do so, the map-reduce client (320) can generate tokens (380), with each token being generated using a vector with a set of match values. The client (320) can provide the counting value cyphertexts (370), non-counting value cyphertexts (375), and the tokens (380) to the map-reduce cluster to perform counts of how many counting value cyphertexts (370) can be decrypted with each of the hidden vector encryption tokens (380). The encrypted identifiers for the tokens (380) can be sent to the map-reduce cluster (310) along with the tokens (380), and the map-reduce cluster (310) can keep each encrypted identifier with its associated token (380) and/or with information resulting from its associated token (380) throughout the map-reduce process.

For example, the map-reduce cluster (310) can perform a mapping function that includes mappers attempting to decrypt the cyphertexts (370 and 375) using the tokens (380), and producing intermediate pairs that each include an encrypted identifier of the token (380) used for the decryption and a counting value (340) or non-counting value (345). The intermediate pairs can be partitioned so that a partition includes intermediate pairs with values decrypted with a particular token (380).

The map-reduce cluster can also perform a reducing function that includes reducers performing an additively homomorphic encryption scheme summation on the counting values (340) and non-counting values (345) for a particular partition. The summation will result in counting the counting values (340), and not counting the non-counting values (345), as discussed above (e.g., because the counting values (340) are encryptions of the value 1 and the non-counting values are encryptions of the value 0). The reducers can output pairs that include an encrypted identifier identifying a token (380) and a value that is an additively homomorphic encryption of the summation of the counting values (340) that were decrypted using the token (380). These output pairs can be returned to the map-reduce client (320) as count representations (390).

The client (320) can decrypt the values of the count representations (390) according to the additively homomorphic encryption scheme to produce decrypted counts (395).

The client (320) may use the hidden vector encryption to privately delegate to the map-reduce cluster (310) counts to be used in various different operations. For example, the client (320) may delegate to the map-reduce cluster (310) counts of samples in training data that have real sample values (350) that match particular token match values. Such counts may be useful for different techniques such as constructing language models that use estimated probabilities derived from counts of samples in training data (e.g., where samples are queries from query logs). Another example of such a technique is in classification scenarios such as constructing decision trees, which will be discussed in more detail below.

B. Using Hidden Vector Encryption Counting Delegation in Decision Tree Construction Classification can be performed where input data is training data that has multiple samples. Each of the samples can have a class value and one or more attribute values, with the attribute values each corresponding to a particular attribute (e.g., the values rain, snow, sunny, overcast, and partly cloudy corresponding to a general weather attribute). A data structure can be constructed using such samples, where the data structure can yield a class value (e.g., a prediction of the class value, such as a prediction of future weather) based on input attribute values. One example of such a structure is a decision tree.

The internal nodes of a decision tree are test nodes for the attribute values of an attribute set being tested. Each such node is labeled with an attribute name and has as many outgoing edges as there are potential values for that attribute. Paths along the nodes lead to leaves of the tree that are labeled with the expected class value for the attribute set whose values match the path from the root node to that leaf node. Here, matching refers to a sample being tested having values for the attribute labels on the nodes on the path corresponding to the attribute values for the edge values on that path. A decision tree can be constructed from training data that includes samples with both attribute and class values. The samples can be used to produce predicted classes for new attribute sets that have only attribute values.

In the example where the map-reduce client (320) is constructing a decision tree, the map-reduce client (320) can maintain a decision tree data structure (385). The data structure (385) can represent the decision tree that is being constructed by the client (320), and the data structure (385) can be modified as nodes are produced and filled in with attribute labels (for internal nodes) or classes (for leaf nodes).

A technique commonly referred to as the ID3 algorithm or ID3 technique is often used to construct decision trees. The ID3 technique can be performed in a computing environment to construct a decision tree in a top-down recursive manner starting from a root node, where for each node an attribute label can be chosen out of a subset of attributes that have not yet been assigned on the path to that node (i.e., unassigned attributes). The attribute out of this unassigned subset that produces the greatest "gain" can be selected for the node, where the "gain" is an estimate of how well an attribute will classify the training data samples that are applicable to the internal node in question (i.e., that match the partial path from the root node to the internal node in question.

Following is a discussion of the ID3 technique, where T is a set of training samples with attributes $R=\{A_1, \ldots, A_r\}$ and a class C. Each attribute $A_i$ has $l(A_i)$ possible values $a_{i,1}, \ldots, a_{i,l(A_i)}$, and the class C has t possible values $c_1, \ldots, c_t$. The ID3 technique can be performed to build a decision tree from the training samples by evaluating each node in the top-down recursive manner discussed above.

For each node, if R is empty or if all the sample attributes $A_i$ have already been assigned on a path to the node in question, then a leaf node can be returned. The leaf node can be assigned a class value that is assigned to more of the subset of training samples applicable to that node than other potential class values, where the subset of training samples applicable to a node is the subset with attributes that match the attributes on the path to the leaf node. For a root node, the subset is all the training samples in T.

Additionally, for each node, if all the subset of training samples applicable to that node have only one class, then a leaf node can be returned for that node, with the class assigned as that one class.

If neither of the two conditions above applies, and there is only one unassigned attribute remaining, that unassigned attribute can be selected for the node. Otherwise, it can be determined which unassigned attribute has the highest gain according to the equation below.

$$\text{Gain}(A) = H_C(T_s) - H_C(T_s \mid A), \text{ where}$$

$$H_C(T_s) = \sum_{i=1}^{|C|} -\frac{|T_s(c_i)|}{|T_s|} \log \frac{|T_s(c_i)|}{|T_s|}, \text{ and}$$

$$H_C(T_s \mid A) = \sum_{j=1}^{l(A)} \frac{|T_s(a_j)|}{|T_s|} H_C(T_s(a_j))$$

Equation 1

In the equation above, $T_s$ is the subset of samples applicable to the node in question, $|T_s|$ denotes a count of samples in $T_s$, $|T_s(c_i)|$ denotes a count samples in $T_s$ with a class value $c_i$, and $|T_s(a_j)|$ denotes a count of samples in $T_s$ with a value $a_j$ for attribute A. The attribute A with the highest gain can be selected as a label for the node in question, and the node can have edges labeled $a_1, \ldots, a_{l(A)}$, such that for every i, the edge with label $a_i$ leads to a node at the next level of the decision tree.

The nodes can continue to be evaluated in this manner until all the paths have reached a leaf node and all the nodes have been labeled with either an attribute A to be evaluated for an internal node or a class value c to be returned for a leaf node. At the level of the root of the tree, the sample counts are restricted according to a single attribute value, but in subsequent evaluation of other nodes in the tree, the counts are restricted to the subset of records that match the partial path from the root to the node in question and that match a specified class value or unassigned attribute value, as noted above.

The computation of counts of the training samples can be expensive in terms of computational resources. Accordingly, it can be useful to delegate these counts to the map-reduce cluster (310) using a map-reduce protocol. However, it can be beneficial to obscure the training samples, the terms (attributes and/or class) matched in the counting, and/or the resulting count values themselves. Accordingly, the counts for performing the ID3 technique can be delegated to the map-reduce cluster using one or more of the hidden vector encryption counting techniques discussed above.

In one implementation, the map-reduce client (320) can compute which combinations of attribute values are to be counted for each node in a particular level of the decision tree data structure (385). All count requests for the level can be submitted to the map-reduce cluster (310) together. The returned results can then be processed to yield counts (395) that can be input according to Equation 1 above, and the appropriate attribute and/or class labels can be assigned to the nodes in the level. The client (320) can then repeat this submission and processing for each level until the decision tree data structure (385) forms a complete decision tree with paths that each lead to a leaf node.

In this decision tree implementation, the training samples for the decision tree can be encrypted as discussed above, including generating counting value cyphertexts (370) and non-counting value cyphertexts (375) using the attribute and class values of the training samples as the real sample values (350). Additionally, fake samples with fake attribute and class values randomly selected from the available attribute and class values in the training samples can be used for the fake sample values (355).

For each of the $|T_s(c_i)|$ counts to be performed for each node, a tuple U can be generated, and that tuple can be used to generate a token according to the hidden vector encryption scheme. Accordingly, for each potential class value c the tuple $U=u_i, \ldots, u_{l+1}$ can be generated for a sample with l attributes $a_1, \ldots, a_l$ having corresponding tuple values $u_1, \ldots, u_l$, and a class c having a corresponding tuple value $u_{l+1}$. For each tuple value $u_j$ corresponding to an attribute already assigned on the path to the node, the tuple value $u_j$ can be set to a value pair $(a_j, 1)$ where $a_j$ is an attribute value corresponding to an edge leading to the node in question, and 1 is a label indicating that a real value (rather than a pseudonym value) is to be matched for that tuple value. The tuple value $u_{l+1}$ can be set to a value pair (c,0), where the label 0 indicates that pseudonyms are to be matched for that tuple value. For tuple values $u_j$ corresponding to an attribute already assigned on the path to the node, the tuple values can be set to wildcard values (*,*). Accordingly, for a token generated from such a tuple, a match will occur if a cyphertext has been encrypted with sample values (350 or 355) that include attributes corresponding to attribute values leading to the node in question as well as a specified class value (i.e., a pseudonym of the class value), regardless of what the sample attribute values are for unassigned attributes.

For each of the $|T_s(a_j)|$ counts to be performed for each node, a tuple W can be generated, and that tuple can be used to generate the token according to the hidden vector encryption scheme. Accordingly, for each attribute value a of each attribute A the tuple $W=w_i, \ldots, w_{l+1}$ can be generated for a sample with l attributes $a_1, \ldots, a_l$ having corresponding tuple values $w_1, \ldots, w_l$, and a class c having a corresponding tuple value $w_{l+1}$. For each tuple value $w_j$ corresponding to an attribute already assigned on the path to the node, the tuple value $w_j$ can be set to a value pair $(a_j, 1)$, where $a_j$ is an attribute value corresponding to an edge leading to the node in question, and 1 is a label indicating that a real value (rather than a pseudonym value) is to be matched for that tuple value. A tuple value $w_t$ corresponding to an unassigned attribute value a to be evaluated can be set to a value pair (a,0), where the label 0 indicates that pseudonyms are to be matched for that tuple value. For tuple values $w_j$ corresponding to other unassigned attributes (i.e., other than a), the tuple values can be set to wildcard values (*,*). Accordingly, for a token generated from such a tuple, a match will occur if a cyphertext has been encrypted with sample values (350 or 355) that include attributes corresponding to attribute values leading to the node in question as well as a specified unassigned attribute value, regardless of what the sample attribute values are for other unassigned attributes.

A randomly intermingled set of counting value cyphertexts (370) and non-counting value cyphertexts (375) can be generated during a pre-processing operation that prepares the database of samples to be sent to the map-reduce cluster (310). When a count of samples in the database is to be delegated (e.g., during construction of a decision tree), the client (320) can generate hidden vector encryption tokens for the tuples U and W, and those tokens can also be sent to the map-reduced cluster (310). The map-reduce cluster (310) can process the counts using these cyphertexts (370 and 375) and the tokens (380) in the manner discussed above, returning count representations (390). The client (320) can decrypt the count representations (390) to produce the counts (395), which in this implementation are the values for $|T_s(c_i)|$ and $|T_s(a_j)|$. For internal nodes, the client (320) can use these counts to determine which attribute has the greatest gain according to the equations above, and to select that attribute as a label for the corresponding node. For a leaf node at level l+1, the client (320) may compute only the U tuples and generate tokens from those tuples as discussed above (without computing W tuples). Based on the resulting class value counts $|T_s(c_i)|$ for the leaf node, the client (320) can assign to the leaf node a class label for the class value that has the most counts among the samples with values matching the path form the root node to that leaf node.

Variations of the tools and techniques discussed above may be implemented. For example, in some implementations fake values or pseudonyms may be omitted, or the additively homomorphic encryption scheme techniques may be omitted (so that the map-reduce cluster can just sum count values for each token without using procedures from an additively homomorphic encryption scheme). For example, such implementations may be used where lesser levels of security are deemed adequate. As another example, some or all of the summing operations may be performed in the mappers of the map-reduce cluster (310), rather than in the reducers.

III. Techniques for Counting Delegation Using Hidden Vector Encryption

Some techniques for counting delegation using hidden vector encryption will now be discussed. Each of these techniques and those discussed above can be performed in a computing environment. For example, each technique may be performed in a computer system that includes at least one processor and a memory including instructions stored thereon that when executed by the at least one processor cause the at least one processor to perform the technique (a memory stores instructions (e.g., object code), and when the processor(s) execute(s) those instructions, the processor(s) perform(s) the technique). Similarly, one or more computer-readable storage media may have computer-executable instructions embodied thereon that, when executed by at least one processor, cause the at least one processor to perform the technique.

Figure 4:
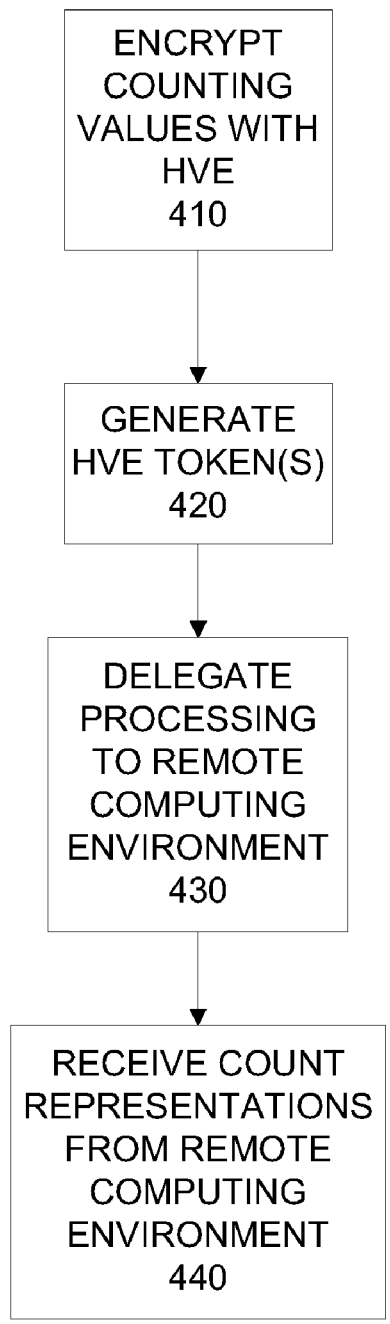
FIG. 4 is a flowchart of another technique for counting delegation using hidden vector encryption.

Referring to FIG. 4, a technique for counting delegation using hidden vector encryption will be described. The technique can include encrypting (410) counting values as a set of counting value cyphertexts according to a hidden vector encryption scheme using sample values of a set of samples, where each of the samples includes multiple sample values. One or more tokens can be generated (420). The tokens can be configured according to the hidden vector encryption scheme such that each token enables decryption of matching cyphertexts that match a set of one or more match values used to generate the token(s). Processing of the counting value cyphertexts and the tokens can be delegated (430) to a remote computing environment, and count representations can be received (440) back from the remote computing environment. Each of the count representations can represent a count of one or more of the cyphertexts whose decryption was enabled by a set of one or more of the tokens.

Encrypting (410) the counting values can include using the values of the set of samples to generate vectors and using the vectors to encrypt the counting values. The vectors can include at least a portion of the values of the samples. However, the vectors may include a set of multiple terms for each of one or more values of the set of samples, and each set of multiple terms can include a set of one or more pseudonyms. The technique may further include count representations for a group of tokens generated using a set of multiple terms for one of the values of the set of samples.

Each of the counting values can be a cyphertext encrypted using an additively homomorphic encryption scheme, and the count representations can also be cyphertexts encrypted according to the additively homomorphic encryption scheme. Moreover, the technique can further include processing the count representations according to the additively homomorphic encryption scheme to produce decrypted count values.

The technique of FIG. 4 may also include encrypting non-counting values as a set of non-counting value cyphertexts according to the hidden vector encryption scheme, and delegating processing of the non-counting value cyphertexts to the remote computing environment along with the counting value cyphertexts. The non-counting values can be encrypted using the additively homomorphic encryption scheme. The count representations can be such that the representations do not represent counts of the non-counting value cyphertexts. For example, each of the non-counting value(s) can be an encryption of zero.

The remote computing environment can be a map-reduce computer cluster. Delegating (430) can include delegating to the map-reduce cluster processing of a set of computer-executable instructions to perform a map-reduce operation. The map-reduce operation can include performing a mapping operation that includes using each token to decrypt corresponding counting cyphertexts to produce the counting values, and performing a reducing operation that includes performing a summation of the counting values to produce the count representations. As noted above, each of the counting values can be a cyphertext encrypted using an additively homomorphic encryption scheme. The summation of the counting values can be a summation operation for summing encrypted values according to that scheme to produce count representations that are cyphertexts, which are also encrypted according to that scheme. The technique can further include processing the count representations according to the additively homomorphic encryption scheme to produce decrypted count values.

Additionally, in the technique of FIG. 4 the count representations can include representations of counts of a set of samples having attribute values for a set of available attributes that can be selected for evaluation in a node of a decision tree. The count representations may also include representations of counts of classes for the set of samples. The technique can additionally include determining which of the set of available attributes to select as an attribute to be evaluated for the node. The determination of which of the set of available attributes to select can include using the count representations. Additionally, determining which of the attributes to select can include computing a gain for each of the attributes using the count representations.

The set of samples discussed above with reference to FIG. 4 may be a first set of samples, the set of available attributes can be a first set of available attributes, and the node can be a first node. The count representations can additionally include representations of counts of a second set of samples having attribute values for second set of available attributes that can be selected for evaluation in a second node in a same level of the decision tree as the first node. The count representations can also include representations of counts of classes for the second set of samples. The technique can further include determining which of the second set of available attributes to select as an attribute to be evaluated for the second node, which can include using the count representations.

Figure 5:
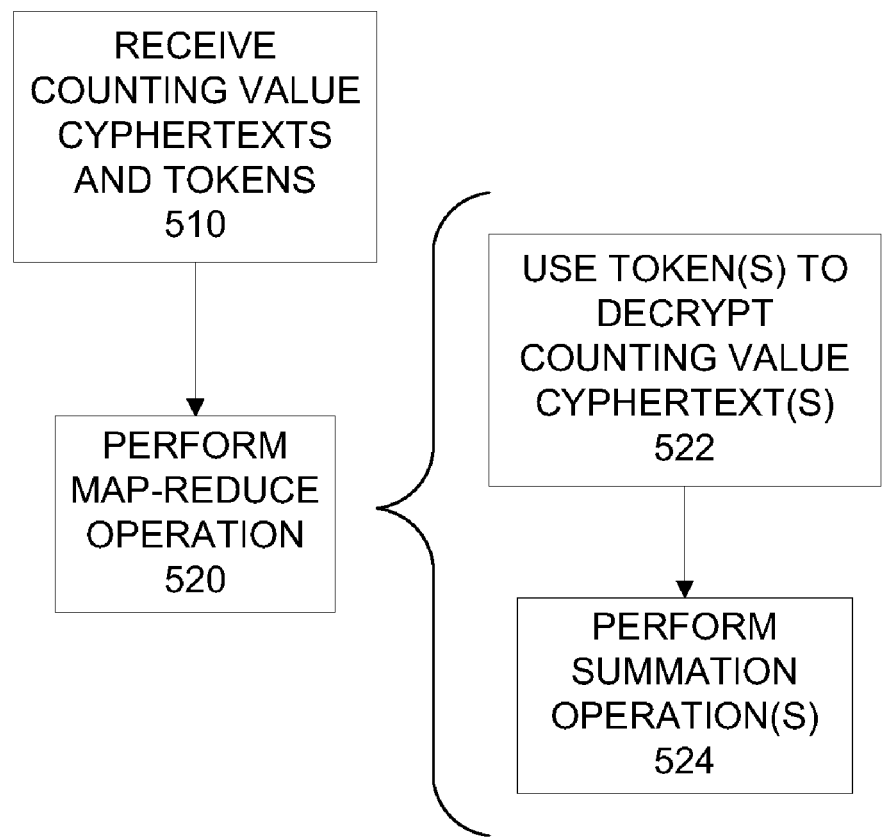
FIG. 5 is a flowchart of yet another technique for counting delegation using hidden vector encryption.

Referring now to FIG. 5, another technique for counting delegation using hidden vector encryption will be discussed. The technique can include receiving (510) a set of counting value cyphertexts and a set of tokens. The counting value cyphertexts and the tokens can be configured according to a hidden vector encryption scheme. A map-reduce operation can be performed (520) in a computer cluster. The map-reduce operation can include performing in parallel one or more operations. These operations can include using (522) one or more of the tokens to decrypt one or more corresponding counting value cyphertexts to produce one or more counting values. These operations can also include performing (524) one or more summation operations of at least a portion of the counting values to produce one or more count representations. Each of the count representation(s) can represent a count of a set of one or more of the counting value cyphertexts whose decryption was enabled by a set of one or more of the tokens.

Using (522) the token(s) can include performing a plurality of mapping operations in parallel, where each of the mapping operations includes using one of the tokens to decrypt corresponding counting value cyphertext(s) to produce counting value(s). Additionally, performing the summing operation(s) can include performing reducing operation(s) in the computer cluster. Each of the reducing operation(s) can include performing a summation operation of at least a portion of the counting values to produce a count representation representing a count of a set of the counting value cyphertext(s) whose decryption was enabled by one of the one or more tokens.

The counting values discussed above with reference to FIG. 5 can be encrypted according to an additively homomorphic encryption scheme, and performing summation operation(s) can include performing summation operation(s) according to the additively homomorphic encryption scheme. Additionally, a set of set of non-counting value cyphertexts can be received with the counting value cyphertexts. Performing the map-reduce operation in the computer cluster can include using one or more of the tokens to decrypt one or more corresponding non-counting value cyphertexts to produce one or more non-counting values. The non-counting value(s) can be encrypted according to the additively homomorphic encryption scheme. The count representation(s) can be such that they do not represent counts of the non-counting values. As an example, each of the non-counting value(s) can be an encryption of a zero value.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
encrypting counting values as a set of counting value cyphertexts according to a hidden vector encryption scheme using sample values of a set of samples, each of the samples comprising a plurality of sample values;
generating one or more tokens that are configured according to the hidden vector encryption scheme such that each token of the one or more tokens enables decryption of matching cyphertexts that match a set of one or more match values used to generate the token;
delegating processing of the counting value cyphertexts and the tokens to a remote computing environment; and
receiving count representations from the remote computing environment, each of the count representations representing a count of a set of one or more of the counting value cyphertexts whose decryption was enabled by a set of one or more of the tokens.

2. The method of claim 1, wherein encrypting the counting values comprises using the values of the set of samples to generate vectors and using the vectors to encrypt the counting values.

3. The method of claim 2, wherein the vectors comprise at least a portion of the values of the set of samples.

4. The method of claim 2, wherein the vectors comprise a set of multiple terms for each of one or more of the values of the set of samples, each set of multiple terms including a set of one or more pseudonyms.

5. The method of claim 4, further comprising summing count representations for a group of tokens generated using a set of multiple terms for one of the values of the set of samples.

6. The method of claim 1, wherein:
each of the counting values is a cyphertext encrypted using an additively homomorphic encryption scheme;
the count representations are cyphertexts encrypted according to the additively homomorphic encryption scheme; and
the method further comprises processing the count representations according to the additively homomorphic encryption scheme to produce decrypted count values.

7. The method of claim 6, further comprising:
encrypting non-counting values as a set of non-counting value cyphertexts according to the hidden vector encryption scheme, the non-counting values being encrypted using the additively homomorphic encryption scheme; and
delegating processing of the non-counting value cyphertexts to the remote computing environment along with the counting value cyphertexts;
wherein the count representations do not represent counts of the non-counting value cyphertexts.

8. The method of claim 1, wherein the remote computing environment is a map-reduce computer cluster.

9. The method of claim 1, wherein the remote computing environment is a map-reduce cluster and wherein delegating comprises delegating to the map-reduce cluster processing of a set of computer-executable instructions to perform a map-reduce operation comprising:
perform a mapping operation that comprises using each token to decrypt corresponding counting cyphertexts to produce the counting values; and
performing a reducing operation that comprises performing a summation of the counting values to produce the count representations.

10. The method of claim 9, wherein:
each of the counting values is a cyphertext encrypted using an additively homomorphic encryption scheme;
the summation of the counting values is a summation operation for summing encrypted values according to the additively homomorphic encryption scheme to produce the count representations as cyphertexts that are also encrypted according to the additively homomorphic encryption scheme; and wherein the method further comprises processing the count representations according to the additively homomorphic encryption scheme to produce decrypted count values.

11. The method of claim 1, wherein:

the count representations comprise representations of counts of a set of samples having a plurality of attribute values for set of available attributes that can be selected for evaluation in a node of a decision tree, as well as representations of counts of classes for the set of samples; and the method further comprises determining which of the set of available attributes to select as an attribute to be evaluated for the node, the determination of which of the set of available attributes to select comprising using the count representations.

12. The method of claim 11, wherein determining which of the plurality of attributes to select comprises computing a gain for each of the attributes using the count representations.

13. The method of claim 12, wherein:

the set of samples is a first set of samples;

the set of available attributes is a first set of available attributes;

the node is a first node;

the count representations further comprise representations of counts of a second set of samples having a plurality of attribute values for second set of available attributes that can be selected for evaluation in a second node in a same level of the decision tree as the first node, as well as representations of counts of classes for the second set of samples; and the method further comprises determining which of the second set of available attributes to select as an attribute to be evaluated for the second node, the determination of which of the second set of available attributes to select comprising using the count representations.

14. A computer system comprising:

at least one processor; and at least one memory comprising instructions stored thereon that when executed by the at least one processor cause the at least one processor to perform acts comprising:

receiving a set of counting value cyphertexts and a set of tokens, the counting value cyphertexts and the tokens being configured according to a hidden vector encryption scheme;

performing a map-reduce operation in a computer cluster in the computer system, the map-reduce operation comprising performing a set of operations comprising:

using one or more tokens of the set of tokens to decrypt one or more corresponding counting value cyphertexts of the set of counting value cyphertexts to produce one or more counting values; and performing one or more summation operations of at least a portion of the counting values to produce one or more count representations, each of the one or more count representations representing a count of a set of one or more of the counting value cyphertexts whose decryption was enabled by a set of one or more of the tokens.

15. The computer system of claim 14, wherein using the one or more tokens of the set of tokens to decrypt one or more corresponding counting value cyphertexts comprises performing a plurality of mapping operations in parallel, each of the mapping operations comprising using a token of the set of tokens to decrypt one or more corresponding counting value cyphertexts of the set of counting value cyphertexts to produce one or more counting values.

16. The computer system of claim 15, wherein performing the one or more summation operations comprises performing one or more reducing operations in the computer cluster, each of the one or more reducing operations comprising performing a summation operation of at least a portion of the counting values to produce a count representation representing a count of a set of one or more of the counting value cyphertexts whose decryption was enabled by one of the one or more tokens.

17. The computer system of claim 14, wherein the counting values are encrypted according to an additively homomorphic encryption scheme, and wherein performing the one or more summation operations comprises performing one or more summation operations according to the additively homomorphic encryption scheme.

18. The computer system of claim 17, further comprising receiving a set of non-counting value cyphertexts with the counting value cyphertexts, wherein:

performing the map-reduce operation in the computer cluster comprises using one or more tokens of the set of tokens to decrypt one or more corresponding non-counting value cyphertexts of the set of counting value cyphertexts to produce one or more non-counting values, the one or more non-counting values being encrypted according to the additively homomorphic encryption scheme; and the one or more count representations do not represent counts of the non-counting values.

19. One or more computer-readable storage media having computer-executable instructions embodied thereon that, when executed by at least one processor, cause the at least one processor to perform acts comprising:

encrypting values using an additively homomorphic encryption scheme to form counting values and non-counting values;

encrypting the counting values as a set of counting value cyphertexts according to a hidden vector encryption scheme using real values of a set of real samples to generate real vectors and using the real vectors to encrypt the counting values, the real values comprising one or more real attribute values and a real class value for each of the real samples;

encrypting the non-counting values as a set of non-counting value cyphertexts according to the hidden vector encryption scheme using fake values of a set of fake samples to generate fake vectors and using the fake vectors to encrypt the non-counting values, the fake values comprising one or more fake attribute values and a fake class value for each of the fake samples;

maintaining a data structure comprising at least a portion of a decision tree to be constructed using the set of samples;

identifying one or more nodes of the decision tree for which an attribute is to be selected for evaluation at that node;

generating one or more tokens that are configured according to a hidden vector encryption scheme such that each token of the one or more tokens enables decryption of matching cyphertexts that match a set of one or more match values used to generate the token;

delegating processing of the counting value cyphertexts, the non-counting value cyphertexts, and the tokens to a map-reduce computer cluster; and receiving count representations from the map-reduce computer cluster, each of the count representations representing a count of a set of one or more of the counting value cyphertexts whose decryption was enabled by a set of one or more of the tokens, the count representations being cyphertexts encrypted according to the additively homomorphic encryption scheme, and the count representations not representing counts of the non-counting value cyphertexts;

processing the count representations according to the additively homomorphic encryption scheme to produce decrypted count values;

for each node of the one or more nodes, performing the following:
  determining which of a set of available attributes to select as a selected attribute to be evaluated for the node, the determination of which of the set of available attributes to select comprising using at least a portion of the decrypted count values; and
  configuring the decision tree to evaluate the selected attribute at the node.

20. The one or more computer-readable storage media of claim 19, wherein:
  the real vectors comprise a set of multiple terms for each of one or more of the real values of the set of real samples, each set of multiple terms including a set of one or more pseudonyms;
  the fake vectors comprise a set of multiple terms for each of one or more of the fake values of the set of fake samples, each set of multiple terms including a set of one or more pseudonyms; and
  processing the count representations comprises summing count representations for a group of tokens generated using a set of multiple terms for one of the real values of the set of real samples.

* * * * *